(12) United States Patent
Hobohm et al.

(10) Patent No.: US 8,882,406 B2
(45) Date of Patent: Nov. 11, 2014

(54) MILLING CUTTER, ESPECIALLY A ROUND-HEAD MILLING CUTTER

(75) Inventors: Uwe Hobohm, Wendelstein (DE); Heinrich Georg Manner, Guteneck (DE); Werner Zitzmann, Wernberg-Köblitz (DE)

(73) Assignee: Kennametal Inc., Latrobe, PA (US)

( * ) Notice: Subject to any disclaimer, the term of this patent is extended or adjusted under 35 U.S.C. 154(b) by 315 days.

(21) Appl. No.: 13/397,655

(22) Filed: Feb. 15, 2012

(65) Prior Publication Data

US 2013/0051940 A1 Feb. 28, 2013

(30) Foreign Application Priority Data

Feb. 24, 2011 (DE) .......................... 10 2011 012 140

(51) Int. Cl.
*B23C 5/10* (2006.01)
*B23C 5/28* (2006.01)

(52) U.S. Cl.
CPC ........... *B23C 5/10* (2013.01); *B23C 2210/0485* (2013.01); *B23C 2210/0442* (2013.01); *B23C 2210/03* (2013.01); *B23C 2210/02* (2013.01); *B23C 2210/204* (2013.01); *B23C 5/28* (2013.01); *B23C 2240/08* (2013.01)
USPC .............................................. 407/53; 407/61

(58) Field of Classification Search
CPC .... B23C 5/10; B23C 5/1009; B23C 2210/02; B23C 2210/03; B23C 2210/0421; B23C 2210/0428; B23C 2210/08; B23C 2210/082; B23C 2210/123
USPC ..................................... 407/32, 53, 54, 61–63
See application file for complete search history.

(56) References Cited

U.S. PATENT DOCUMENTS

| 4,383,784 | A | * | 5/1983 | Gulbrandsen | ................. 408/144 |
| 5,455,993 | A | | 10/1995 | Link et al. | |
| 6,220,797 | B1 | * | 4/2001 | Ishii et al. | ..................... 408/144 |
| 6,280,126 | B1 | | 8/2001 | Slocum et al. | |
| 6,368,030 | B1 | * | 4/2002 | Sato et al. | ....................... 407/53 |

(Continued)

FOREIGN PATENT DOCUMENTS

| EP | 1535682 | 6/2005 |
| EP | 1535682 A1 | 6/2005 |

(Continued)

OTHER PUBLICATIONS

Haimer, Franz, EPO Machine Translation of WO 2006/050952 A1 "Vibration-Damped Tool Holder," May 18, 2006.

*Primary Examiner* — Daniel Howell
*Assistant Examiner* — Nicole N Ramos
(74) *Attorney, Agent, or Firm* — Larry R. Meenan, Esq.

(57) ABSTRACT

The milling cutter, in particular a round-head milling cutter, has a tool head, which extends along an axial direction and has a number of cutting teeth that each have a cutting edge. Chip flutes are located between each of the cutting teeth. The cutting teeth each have a front-side radial portion and a circumferential axial portion. The respective cutting edge and the chip flute are disposed such that they are inclined in opposite directions with respect to the axial direction such that the cutting tooth widens towards a foot region. In another embodiment, the tool head has two parts: a carrier part made of a tool steel, and a cutting part made of hard metal fastened to the carrier part. The milling cutter is distinguished by a long service life with a high cutting rate and a high quality of machining.

15 Claims, 5 Drawing Sheets

(56) References Cited

U.S. PATENT DOCUMENTS

| | | | |
|---|---|---|---|
| 6,655,883 B2 | 12/2003 | Maar | |
| 6,846,135 B2 * | 1/2005 | Kuroda et al. | 407/53 |
| 6,997,651 B2 * | 2/2006 | Kawai et al. | 407/53 |
| 7,028,997 B2 | 4/2006 | Takahashi et al. | |
| 7,125,210 B2 * | 10/2006 | Kolker et al. | 409/234 |
| 7,878,739 B2 * | 2/2011 | Maeda | 407/119 |
| 7,913,595 B2 | 3/2011 | Neumeier | |
| 2002/0037199 A1 | 3/2002 | Satran et al. | |
| 2003/0147712 A1 | 8/2003 | Kai et al. | |
| 2006/0039767 A1 * | 2/2006 | Yamamoto et al. | 408/230 |
| 2008/0290613 A1 | 11/2008 | Haimer | |
| 2009/0003947 A1 | 1/2009 | Haimer et al. | |
| 2010/0061820 A1 | 3/2010 | Haimer | |
| 2010/0176562 A1 | 7/2010 | Linzell | |
| 2010/0196108 A1 | 8/2010 | Oka et al. | |

FOREIGN PATENT DOCUMENTS

| | | | | |
|---|---|---|---|---|
| FR | 2239849 | A | * | 4/1975 |
| FR | 2902680 | | | 12/2007 |
| FR | 2902680 | A1 | | 12/2007 |
| GB | 1578342 | | | 11/1980 |
| GB | 1578342 | A | | 11/1980 |
| GB | 2404890 | | | 2/2005 |
| JP | 2001079725 | | | 3/2001 |
| JP | 2001079725 | A | | 3/2001 |
| JP | 2003291024 | A | * | 10/2003 |
| JP | 2005118960 | A | * | 5/2005 |
| JP | 2007075944 | A | * | 3/2007 |
| JP | 2007290105 | A | | 11/2007 |
| JP | 2008049404 | A | * | 3/2008 |
| WO | 02/076661 | A1 | | 10/2002 |
| WO | 2005107982 | A1 | | 11/2005 |
| WO | WO-2005107982 | | | 11/2005 |
| WO | 2006050952 | A1 | | 5/2006 |
| WO | 2007019827 | A1 | | 2/2007 |
| WO | 2008116446 | A1 | | 10/2008 |
| WO | 2008130521 | A2 | | 10/2008 |
| WO | WO-2008130521 | | | 10/2008 |
| WO | 2010/050391 | A1 | | 5/2010 |

\* cited by examiner

MILLING CUTTER, ESPECIALLY A ROUND-HEAD MILLING CUTTER

CLAIM TO PRIORITY

This application is a National entry application of German Application No. 102011012140.4-14, filed Feb. 24, 2011, the entire contents of which is incorporated herein by reference.

BACKGROUND OF THE INVENTION

1. Field of the Invention

The invention relates to a milling cutter having the features of the preamble of claim 1, and of the preamble of claim 9.

2. Description of Related Art

Such milling cutters, in particular round-head milling cutters, are known, for example, from WO 2008/116446 A1 and DE 697 29 945 T2.

In the present case, round-head milling cutters, also known as ball milling cutters, are understood generally to mean those shank milling cutters that have a tool head comprising a number of cutting teeth that each comprise a cutting edge. The respective cutting edge in these cases first runs radially outward, approximately in the radial direction, in a front-side radial portion of the respective cutting tooth, and passes, via an arcuate course, into a circumferential axial portion of the cutting tooth extending substantially in the axial direction. A ball milling cutter in the narrower sense is understood in this case to mean a ball head geometry in which the respective cutting edge runs, immediately from the center of the drill bit, along an arcuate line and has a constant radius. Ball milling cutters in the present case are also understood to mean milling cutters having a toroidal geometry, in which the cutting edge regions have differing radii, or can also run rectilinearly in the radial portion and/or axial portion.

Such round-head milling cutters are used to produce "ball races" in only one process step. Such ball race milling is used, in particular, in the field of automobiles, particularly in the field of wheel suspensions, to enable an articulated wheel fastening to be achieved. The desired ball race in such cases is made on the circumferential side of a metal disk, traversing the latter.

Owing to the high numbers of pieces, the process in such cases is a mass production process. Accordingly, what is important is a process speed that is as high as possible with, at the same time, a good quality of machining without any reworking steps. Furthermore, it is necessary for the tool to have a long service life, in order that the production process is not encumbered by a multiplicity of necessary tool changing operations. In any case, fundamentally, there is the problem that the machining quality becomes critical as the process speed increases, or that the cutting edges do not withstand being subjected to greater load. In particular, there is also the problem of an uneven machining process that subjects the tool to stress, as well as the problem of burr formation.

According to WO 2008/116446 A1, a milling head made of solid hard metal is provided, in which cutting inserts are used supplementally to realize the cutting edges. The milling head is connected to a tool holder via an intermediate piece. In the case of the design according to DE 697 29 945 T2, the milling head is composed of a material produced by powder metallurgy, and is connected to a tool holder via a tie rod, made of steel, that defines a clamping shank. In both known embodiment variants, coolant channels are routed into the tool head, which coolant channels open out into chip flutes realized between the individual cutting teeth.

SUMMARY OF THE INVENTION

Proceeding from this, the invention is based on the object of specifying a milling cutter, in particular a round-head milling cutter, that enables a workpiece to be machined to a high quality in one operation, and that has a long service life.

The object is achieved, according to the invention, by a milling cutter having the features of a claim 1. The milling cutter, in particular a round-head milling cutter, comprises a tool head, which extends along an axial direction and has a number of cutting teeth that each have a cutting edge. Formed between the cutting teeth there are clearances, which have chip flutes. The cutting teeth each have a front-side radial portion and a circumferential axial portion. In the axial portion, the respective cutting edge and the chip flute assigned thereto are now disposed such that they are inclined in opposite directions, this being in such a way that the cutting tooth widens in the axial direction towards a foot region. Inclined in opposite directions in this case is understood generally to mean that the angle of inclination of the cutting edge and of the chip flute differ in respect of a radial plane, such that the cutting edge and the chip flute diverge from one another from the front side towards the rear end of the tool head. Radial plane in this case is understood to mean a plane that is spanned by a center axis running in the axial direction and by a radial thereto, and that is intersected by the cutting edge in the axial portion.

The particular advantage of this design consists in that the cutting tooth becomes increasingly broader, and therefore more robust, in the axial direction on the circumferential side, and can therefore absorb greater forces. At the same time, the fact that the chip flute is designed to be opposite in direction reliably ensures that the chips are taken away rearward in the axial direction, this being of substantial importance in particular in preventing burr formation.

According to an expedient development, the cutting edge is oriented at a positive angle of inclination. This positive angle of inclination is, in particular, in the range from 5 to 15°, and in particular, for example, in the region of 10°. A positive angle of inclination is understood generally to mean an orientation of the cutting edge at which, in the machining of a workpiece and with a given direction of rotation of the tool head, it is the cutting portions of the axial portion facing towards the front side that first engage in the workpiece to be machined, and the cutting portions applied to the front side only then engage in succession.

According to a preferred development, it is provided, in particular at the same time, that the chip flute is oriented, in respect of the axial direction, at a negative angle of inclination, which, in particular, is in the range from 1 to 5°. This angle at the same time defines to that extent a helix angle at which the chip flute is set circumferentially. In particular, this combination, of the positive angle of inclination of the cutting edge, in particular in the range from 5 to 15°, and of the negative angle of inclination, in particular in the range from 1 to 5°, has proved to be particularly suitable for reliable milling at high speed and with a good quality of processing.

In a preferred development, a chip-flute guide stage is realized in the axial portion of the cutting tooth, towards the chip flute. The chip guide stage therefore constitutes a transition region, which, owing to the "divergence" of the cutting edge and chip flute from one another, connects the cutting edge to the chip flute assigned thereto. The chip guide stage ensures that chips are reliably deflected from the cutting edge into the chip flute.

In an expedient design, the chip guide stage in this case has a plane chip surface adjoining the respective cutting edge. The chip guide stage therefore has no curvature in the region close to the cutting edge. Rather, it lies in a plane that is spanned by a respective cutting portion in the radial portion of the cutting tooth and in a cutting portion in the axial portion of the cutting tooth.

Preferably, the chip surface passes, via a deflection region, towards the chip flute. It is only in the deflection region, therefore, that the chip guide stage becomes oriented in the circumferential direction towards the chip flute. Preferably, the deflection region is also realized as a flat surface that adjoins the chip surface, in particular realizing a rounded portion. The chip surface and the deflection region in this case are preferably oriented in relation to one another at a deflection angle in the range from 40 to 60°, and in particular in the region of approximately 50°.

Overall, in a preferred design, the chip-flute guide stage passes, at a possibly also rounded edge, into the chip flute. This edge defines a boundary line, and thereby expediently runs, inclined obliquely in relation to the axial direction, from a radially inner position to a radially outer position at the foot region of the cutting tooth. This boundary line defines, as it were, the start of the chip flute along a line. At the front side, this boundary edge, or boundary line, preferably begins approximately in the range from 40 to 70% of the radius of the tool head. In the rear region of the tool head, the boundary edge reaches the circumferential side wall, preferably at an axial height at which the cutting edge ends or has already ended.

The object is furthermore achieved, according to the invention, by a milling cutter having the features of claim 9. According to the latter, the tool head is divided into two parts, being a carrier part and a cutting part, the cutting part having a number of cutting teeth that each have a cutting edge, and the individual cutting teeth are separated from one another by chip flutes. The cutting part in this case is composed of hard metal and is fastened to the carrier part in an irreversible manner, in particular by a material bond, for example by soldering. The carrier part in this case is preferably composed of a material that is softer, and in particular more elastic, than solid hard metal, in particular composed of a suitable tool steel, for example a so-called hot-work steel.

Owing to the high degree of hardness of the cutting part, the latter has a high resistance to wear and good cutting properties. At the same time, because of the great hardness, the cutting part, produced by powder metallurgy, is comparatively brittle, such that producing and machining a tool head composed entirely of solid hard metal is resource-intensive and difficult.

In particular, for example, making cooling channels in a tool head made of solid hard metal is resource-intensive. In a preferred development, therefore, it is also provided that cooling channels already open out in the carrier part. The cutting part composed of the solid hard metal material therefore does not have any cooling channels. In this case, preferably, orifices of the cooling channels open at the front side on the carrier part, i.e. located radially inwardly at a distance from the circumferential surface.

The orifices preferably open in a respective chip flute, in order to ensure an optimum supply of coolant to the respective cutting edges.

Expediently, therefore, it is also provided that the chip flutes are continued from the cutting part into the carrier part.

For this purpose, in respect of production, the procedure is such, in particular, that the prepared cutting part is placed on the carrier part, in particular by soldering, and final machining is then performed, in which, inter alia, the cutting edges and the chip flutes undergo (finish-)grinding. In this grinding operation, the chip flutes are realized in the carrier part. Supplementary finishing measures, such as edge roundings on the cutting edges, are also realized. Expediently, the entire tool head is also provided with a coating, for example a hard material coating deposited by a PVD method, preferably a titanium-aluminum-nitride coating. In particular, a multi-layer coating is provided. The layer thickness is, for example, 3 μm.

The end face of the carrier part constitutes a connection plane towards the cutting part and is constituted, expediently, by a flat plane. The cutting part can engage in the flat plane by means of a centering pin. Expediently, the circumferential sides of the carrier part and of the cutting part are in alignment with one another. The two parts therefore have the same diameter. The carrier part—in the initial state, before being connected to the cutting part—is realized in the form of a disk. The disk thickness, i.e. its extent in the axial direction, is less than or approximately of the same magnitude as the axial length of the cutting part.

According to a preferred design, the clamping shank of the milling cutter and the carrier part of the tool head constitute a single-piece component, which is produced, for example, by machining with removal of material from a (single) workpiece. There is therefore no connection point of any kind between the clamping shank and the carrier part. This single-piece component is realized, expediently, from a tool steel, in particular hot-work steel, that is softer, and in particular more elastic, than the hard metal used for the cutting part.

Expediently, it is furthermore provided that a thread is realized on the clamping shank, which thread is provided for fastening in a tool holder. Evident in this realization is a particular advantage of the two-part design of the tool, wherein the cutting part is soldered onto the carrier part, i.e. is fastened generally by a material bond and in an irreversible manner. This is because, owing to the brittleness, a solid hard-metal tool head cannot easily be clamped directly into a tool holder, or this would result in the immediate breaking of the tool head.

In respect of an optimum machining quality, it is additionally provided, in an expedient development, that there is an uneven number of cutting edges and cutting teeth. In particular, 5 cutting teeth are provided. In order to achieve an optimum concentricity, it is additionally provided, preferably, that the individual cutting edges are distributed unequally. The angular distances between the individual cutting edges therefore vary.

BRIEF DESCRIPTION OF THE DRAWINGS

An exemplary embodiment of the invention is explained more fully in the following with reference to the drawings, wherein.

DETAILED DESCRIPTION OF THE INVENTION

In the figures, parts that perform the same function are denoted by the same references.

Figure 5:
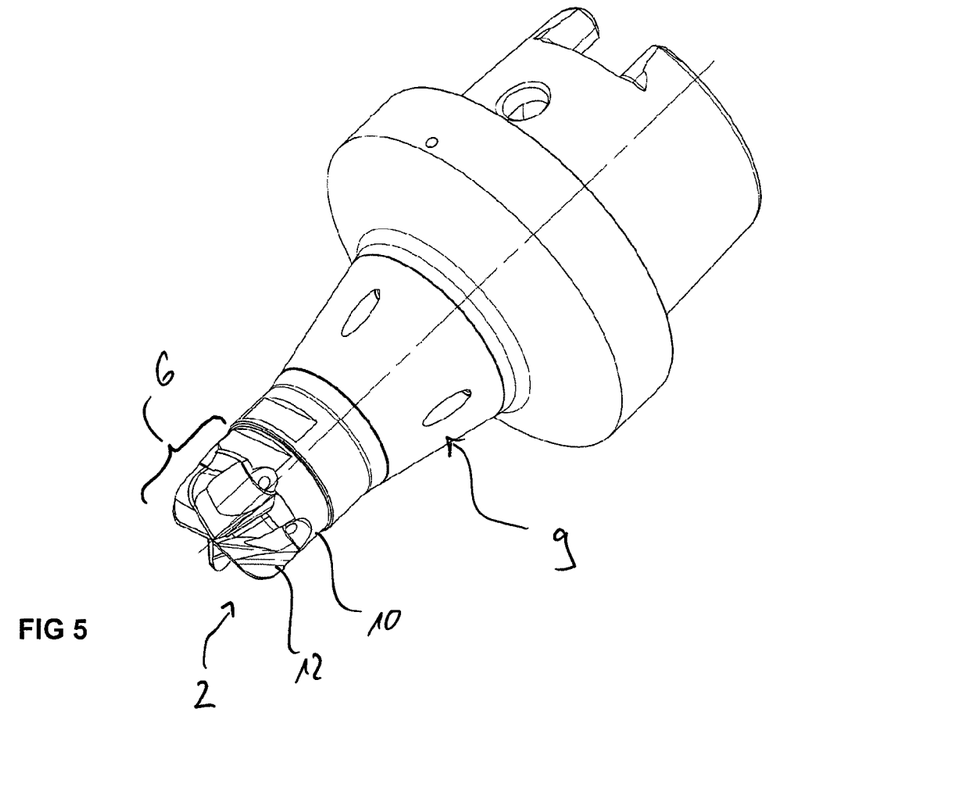

The milling cutter 2 represented in the figures is used generally to produce so-called "ball races", in particular in the field of automobiles, to enable an articulated wheel suspension to be achieved. The milling cutter 2 as a whole extends in the axial direction 4, and has a tool head 6 and, adjoining the latter, a clamping shank 8. The clamping shank 8 is used to clamp the milling cutter 2 in a tool holder 9 (cf. FIG. 5). At its front end, the clamping shank 8 has an adapter collar or guide collar 8A and, at its rear end, it has a draw-in bolt 8A. Clamping in this case is understood to mean any fastening, for example a fastening in the manner of a bayonet lock, but also, in particular, fastening by screwing in.

In the exemplary embodiment, the tool head 6 is realized in two parts, being a carrier part 10 and a cutting part 12 fastened thereon, in particular by hard-soldering. The carrier part 10—as can be seen in FIG. 1—has an engagement surface for a tool, for the purpose of mounting (screwing in) in the tool holder.

The tool head 6 has a plurality of cutting teeth 14, which each carry a cutting edge 16. Realized between each cutting tooth 14 there is a clearance, each of which has a chip flute 18. In the exemplary embodiment, five cutting teeth 14 are provided.

In the case of such shank milling cutters, realized in the manner of ball milling cutters, the cutting teeth 14 have a front-side radial portion 14A, and have a circumferential axial portion 14B extending in the axial direction. A radial portion 14A is understood in this case to mean a portion of the cutting tooth that extends at least substantially in the radial direction. In principle, in this case, an arcuate cutting edge course can also be provided. An axial portion 14B is understood to mean a portion that extends in the axial direction on the circumferential side of the tool head. In the exemplary embodiment, both the radial portion 14A and the axial portion 14B have extensive rectilinear courses, which are connected to one another via an arcuate portion. Corresponding to the cutting teeth 14, the cutting edges 16 are also realized accordingly, i.e. they likewise have an axial portion and a radial portion, which are connected to one another via an arcuate cutting-edge portion. The radial portion 14A, therefore, starting from a front-side milling cutter center, runs outwardly in the radial direction, passes in an arcuate manner into a circumferential side of the tool head 6, and then extends further in the axial direction 4 in the axial portion 14B.

Figure 1:
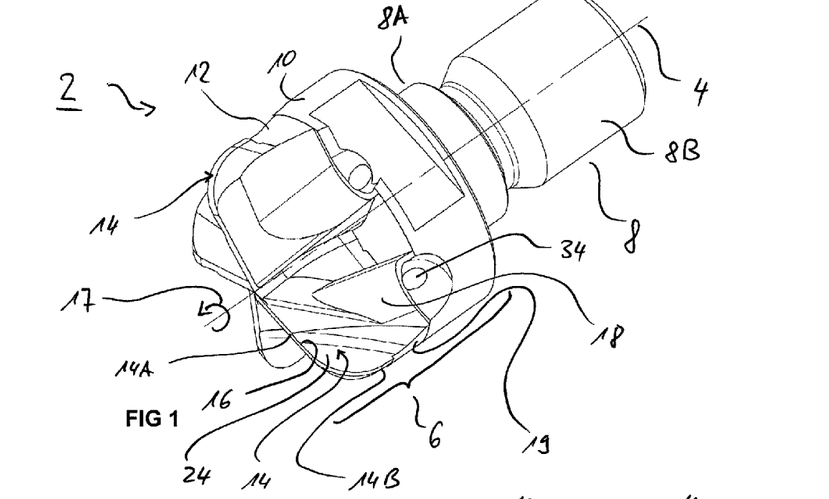
FIG. 1 shows a perspective representation of a milling cutter.

When in operation, the milling cutter 2 rotates about the axial direction 4, which at the same time defines a center axis, in the direction of rotation 17 indicated in FIG. 1.

According to a first aspect, it is then provided that the cutting tooth 14 widens in the axial direction 4 towards a foot region 19, and is thereby rendered robust in its totality. This aspect is now explained more fully, in particular in connection with FIGS. 2a, 2b, 2c and FIGS. 3a, 3b. Of particular importance in this case is the fact that the respective chip flute 18 and the cutting tooth 14, in its axial portion 14B, are realized such that they are inclined in opposite directions in respect of the axial direction 4. This can best be seen from the enlarged representation according to FIG. 3b.

Inclination of the chip flute 18 in this case is understood to mean an inclination of a boundary line 20 of the chip flute 18 in respect of the axial direction 4, this boundary line 20 of the chip flute 18 being defined, in particular, by a grinding operation for the purpose of realizing the chip flute 18. The chip flute is usually realized by using a grinding disk having a rounded circumferential surface, this rounding defining the rounding of the flute. At the same time, the width of the grinding disk defines the width of the flute and, to that extent, the boundary line 20 of the chip flute 18. Therefore, insofar as reference has been made previously to an inclination of the chip flute 18 in respect of the axial direction 4, this means the inclination of the boundary line 20 adjacent to the respective cutting tooth 14.

The inclination of the chip flute 18, or of the cutting tooth 14, is defined in this case in respect of a radial plane. This plane is defined in FIG. 3b by the axial direction 4 and by the perpendicular extending into the plane of the paper.

Figure 3A:
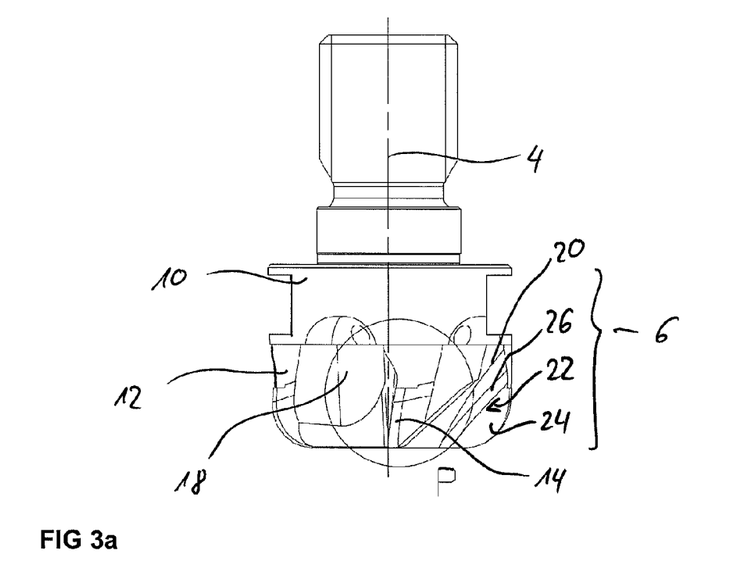
FIG. 3a shows a further side view of the milling cutter according to FIG. 1.
Figure 3B:
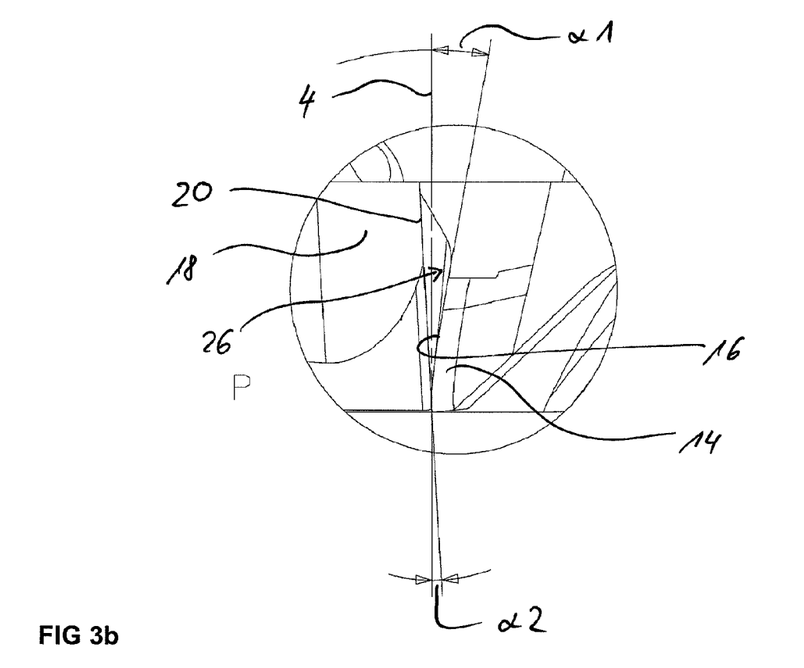
FIG. 3b shows an enlarged representation of the detail P identified by a circle in FIG. 3a, FIG. 4a shows a top view of the front side of the milling cutter according to FIG. 1.

In this case, expediently, the cutting tooth 14 is oriented, in respect of the axial direction 4, at a positive angle of inclination $\alpha 1$, which is preferably in the range between 5° and 10°. At the same time, the chip flute 18 is preferably oriented at a negative angle of inclination $\alpha 2$ in respect of the axial direction 4, this negative angle of inclination $\alpha 2$ being, expediently, in the range up to 5°. In the exemplary embodiment, the value for $\alpha 1$ is 10° and that for $\alpha 2$ is 3°.

As can be seen particularly from FIGS. 1 and 2a, 2b, 2c, the cutting edge 16 is adjoined by a chip guide stage 22, which runs from the respective cutting edge 16 to the boundary line 20, and therefore to the chip flute 18. In the exemplary embodiment, the chip guide stage 22 has a flat, plane chip surface 24 adjoining the cutting edge 16. In the exemplary embodiment, said plane chip surface is realized approximately in the manner of a segment of an arc. The chip surface 24 begins approximately at the level of half the radius in the radial portion 14A and extends, likewise, to approximately half the axial height of the axial portion 14B (cf., in particular, FIG. 1). In this region, the chip surface 24 therefore extends in the plane spanned by the cutting edge 16 (by the axial and radial portions thereof).

Adjoining the chip surface 24, finally, there is a deflection region 26 of the chip guide stage 22. It is only in this deflection region 26, therefore, that the equalization is made towards the chip flute 18 in the circumferential direction.

Figure 2A:
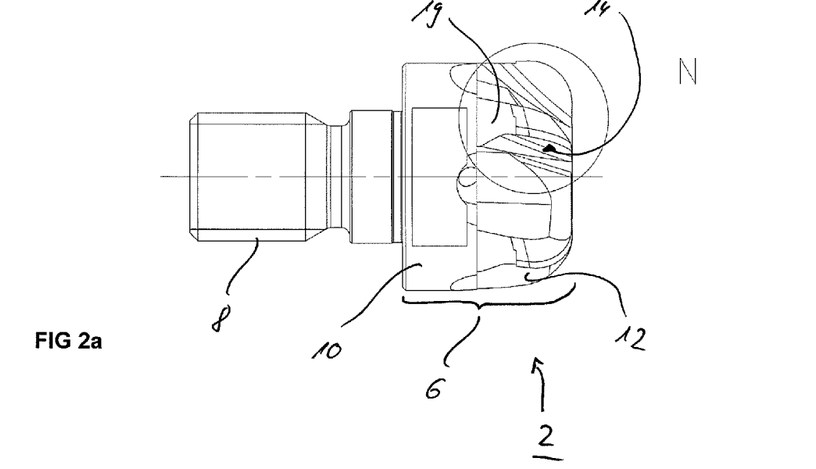
FIG. 2a shows a side representation of the milling cutter according to FIG. 1.
Figure 2B:
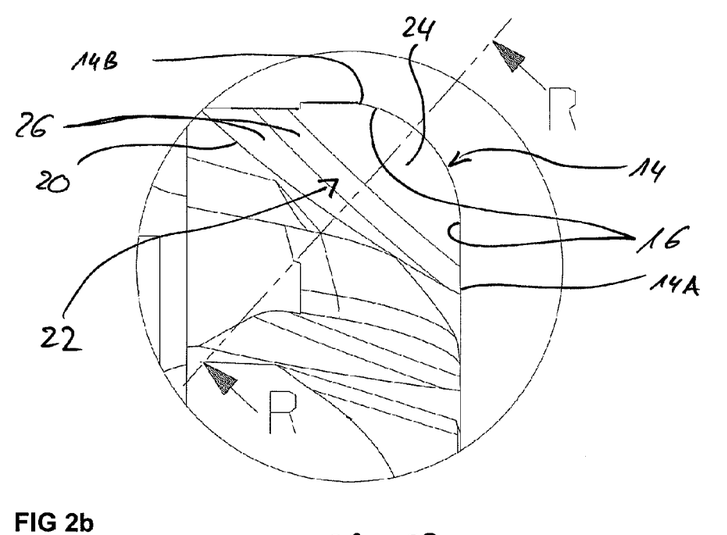
FIG. 2b shows an enlarged representation of the detail N identified by a circle in FIG. 2a, FIG. 2c shows a sectional view according to the section line R-R in FIG. 2b.
Figure 2C:
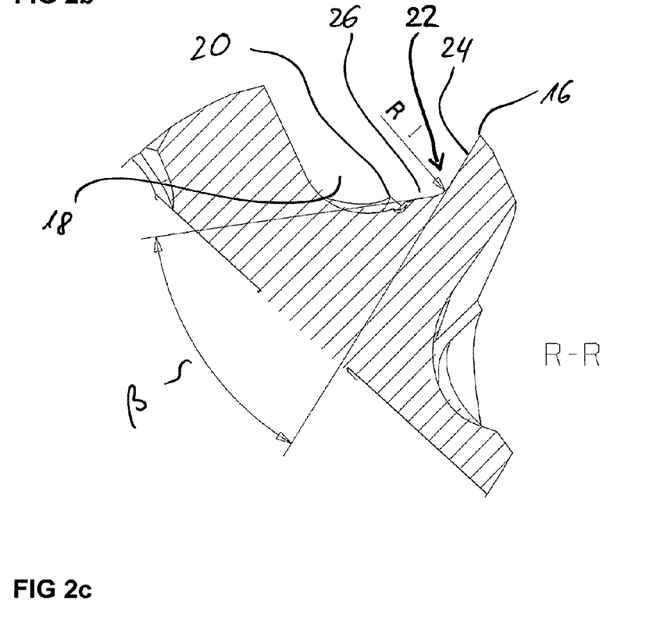

The chip surface 24 and the deflection region 26 towards the boundary line 20 are also shown clearly, in particular, in FIG. 2c. It can be seen from this that the chip surface 24 and the deflection region 26, which is likewise realized as a flat surface, are oriented at a deflection angle $\beta$. The latter is preferably in the range from 40 to 60 degrees, being preferably 50 degrees in the exemplary embodiment.

This special geometry of the cutting edges made it possible to achieve very good machining results at a high machining speed and, at the same time, with a good surface quality. In particular, the special realization of the chip flute 18 and of the cutting tooth 14 in opposite directions enables the cutting tooth 14 to be realized in a robust manner, and at the same time ensures that no burr is produced during milling of the ball race, particularly at a runout end thereof. The counter-directional configuration of the chip flute 18 ensures that the latter is disposed at the negative angle of inclination $\alpha 2$, and that chips are thus removed into the rear axial region. This is of crucial importance for the necessary quality sought in the case of the required high cutting rate (high chip removal rate).

Figure 4A:
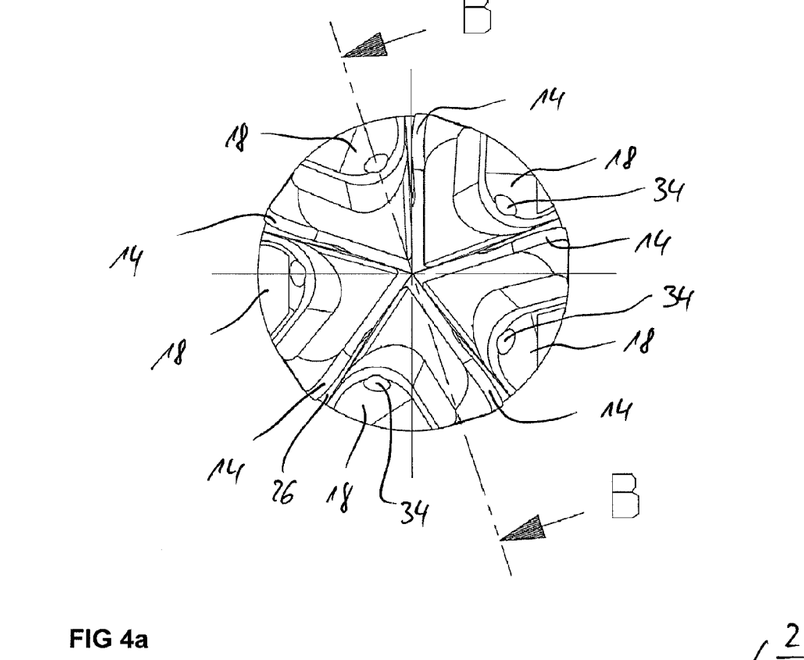
Figure 4B:
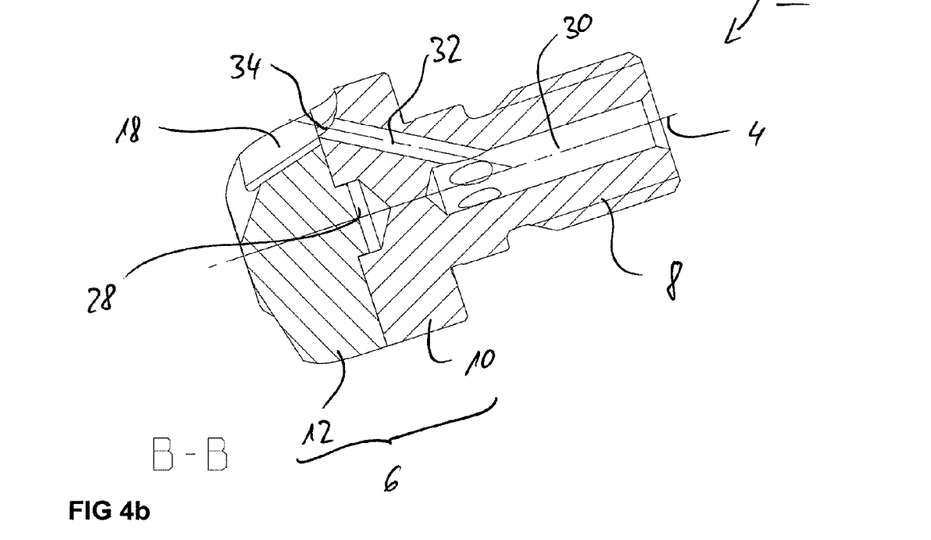
FIG. 4b shows a sectional view according to the section line B-B in FIG. 4a, and FIG. 5 shows a perspective representation of a tool holder with a clamped-in milling cutter according to FIG. 1.

The second aspect, namely the two-part design of the tool head 6, is described more fully in the following, particularly in connection with FIG. 1 and FIGS. 4a and 4b. As can be seen particularly from the sectional representation according to FIG. 4b, the clamping shank 8 and the carrier part 10 constitute one component produced from one piece. In particular, the latter is produced by turning. In this case, this component is composed of a conventional tool steel, in particular of a hot-work steel that is easily machined.

It is of particular importance for the design that the component consisting of the carrier part 10 and the clamping shank 8 is realized approximately in the form of a T, the top side of the T head being realized as a flat side, upon which the cutting part 12 is placed. For the purpose of centering, the cutting part 12 has a centering pin 28. The carrier part 10 and the cutting part 12 therefore have the same diameter, and adjoin one another in a flush manner on the circumferential side.

The clamping shank 8 comprises a central coolant supply 30, from which cooling channels 32, realized as bores, go off obliquely outward, each ending at an orifice 34. The respective orifice 34 is located in the front side of the carrier part 10, and in particular inside the respective chip flute 18. Since the chip flutes 18, which extend into the carrier part 10, are ground in retroactively, the orifice 34 is located in a then domed surface region of the originally plane end face of the carrier part 10. No cooling channels 32 of any kind are realized in the cutting part 12 itself. In respect of production, making the cooling channels 32 exclusively in the carrier part 10, which is composed of the tool steel, can be realized comparatively easily. At the same time, the cutting part 12 is not weakened by the additional realization of cooling channels.

The clamping shank 8, at its rear end, preferably has an outer thread, for screwing into the tool holder 9. The comparatively soft and (ductile) elastic material of the clamping shank 8 enables the milling cutter 2 to be fastened in the tool holder 9 in a reliable and secure manner. The tool holder 9 itself, at its rear end, has a coupling, which, in the exemplary embodiment, is an HSK coupling for reversible fastening to a machine spindle.

Preferably, the entire tool head, both the carrier part 10 and the cutting part 12, is provided with a hard material coating.

In particular, combining the special design of the geometry of the cutting edges (alignment of the cutting teeth 14 and of the chip flutes 18 in opposite directions, in particular with the special configuration of the chip guide stage 22) with the two-part design of the tool head, results in a milling cutter 2, in particular a round-head milling cutter, that is distinguished by significantly improved service lifetimes with a high quality of machining and at a high process speed (high cutting rate).

What is claimed is:

1. A round head milling cutter, comprising a tool head, which extends along an axial direction and defines a central, rotational axis of the milling cutter, and has a plurality of cutting teeth, each cutting tooth having a cutting edge, and wherein chip flutes are disposed between the cutting teeth, each cutting tooth having a front-side radial portion and a circumferential axial portion, wherein the respective cutting edge, in the circumferential axial portion, and the chip flute assigned thereto are inclined in opposite directions with respect of the axial direction in such a way that the cutting tooth widens in the axial direction towards a foot region of the round head milling cutter, wherein the respective cutting edge is oriented, with respect of the axial direction, at a positive angle of inclination ($\alpha 1$), and wherein the chip flute is oriented, with respect of the axial direction, at a negative angle of inclination ($\alpha 2$).

2. The round head milling cutter as claimed in claim 1, wherein the positive angle of inclination ($\alpha 1$) is in the range from 5 to 15°.

3. The round head milling cutter as claimed in claim 1, wherein the negative angle of inclination ($\alpha 2$) is in the range from 1 to 5°.

4. The round head milling cutter as claimed in claim 1, wherein a chip guide stage is in the axial portion of the cutting tooth, towards the chip flute.

5. The round head milling cutter as claimed in claim 4, wherein the chip guide stage has a plane chip surface adjoining the respective cutting edge.

6. The round head milling cutter as claimed in claim 5, wherein a deflection region adjoins the chip surface, towards the chip flute.

7. The round head milling cutter as claimed in claim 4, wherein at a boundary line, the chip guide stage passes into the chip flute.

8. The round head milling cutter as claimed in claim 7, wherein the boundary line runs out, inclined obliquely in relation to the axial direction, from a radially inner position to a radially outer position at the foot region.

9. The round head milling cutter as claimed in claim 1, further comprising a clamping shank for clamping into a tool holder, and a tool head adjoining the clamping shank, wherein the tool head has a carrier part, and has a cutting part comprising a number of cutting edges and chip flutes, and the cutting part is composed of hard metal and is fastened to the carrier part by a material bond.

10. The round head milling cutter as claimed in claim 9, wherein cooling channels are provided, which open out, in the carrier part, at a respective orifice.

11. The round head milling cutter as claimed in claim 10, wherein the orifices open out on the front side on the carrier part.

12. The round head milling cutter as claimed in claim 9, wherein the chip flutes are continued in the carrier part.

13. The round head milling cutter as claimed in claim 9, wherein the cutting part and the carrier part are provided with a common coating.

14. The round head milling cutter as claimed in claim 9, wherein the carrier part and the cutting part are fastened flatly to one another.

15. The round head milling cutter as claimed in claim 9, wherein the clamping shank and the carrier part are a single piece from a steel that is more elastic than hard metal.

* * * * *

UNITED STATES PATENT AND TRADEMARK OFFICE
CERTIFICATE OF CORRECTION

| | | |
|---|---|---|
| PATENT NO. | : 8,882,406 B2 | Page 1 of 1 |
| APPLICATION NO. | : 13/397655 | |
| DATED | : November 11, 2014 | |
| INVENTOR(S) | : Uwe Hobohm et al. | |

It is certified that error appears in the above-identified patent and that said Letters Patent is hereby corrected as shown below:

IN THE CLAIMS

In Column 7, Line 55, in Claim 1, delete "central," and insert -- central --, therefor.

Signed and Sealed this
Thirty-first Day of March, 2015

Michelle K. Lee
*Director of the United States Patent and Trademark Office*